(12) United States Patent
Counselman, III et al.

(10) Patent No.: US 6,492,945 B2
(45) Date of Patent: Dec. 10, 2002

(54) INSTANTANEOUS RADIOPOSITIONING USING SIGNALS OF OPPORTUNITY

(75) Inventors: Charles C. Counselman, III, Belmont, MA (US); Timothy D. Hall, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 09/765,313

(22) Filed: Jan. 19, 2001

(65) Prior Publication Data

US 2002/0126046 A1 Sep. 12, 2002

(51) Int. Cl.[7] .................................................. G01S 3/02
(52) U.S. Cl. ....................................................... 342/464
(58) Field of Search ............................ 342/357.14, 464, 342/463

(56) References Cited

U.S. PATENT DOCUMENTS

| | | | | |
|---|---|---|---|---|
| 5,689,270 A | * | 11/1997 | Kelley et al. | 342/463 |
| 6,094,168 A | * | 7/2000 | Duffett-Smith et al. | 342/463 |
| 6,121,928 A | * | 9/2000 | Sheynblat et al. | 342/463 |

* cited by examiner

Primary Examiner—Gregory C. Issing
(74) Attorney, Agent, or Firm—Choate, Hall & Stewart

(57) ABSTRACT

Instantaneous radio positioning method and system. Signals from a plurality of spatially distributed transmitters are received at a known reference position and at an unknown position to be determined. A composite of the radio signals, simultaneously including a component signed from each of the transmitters, is digitized and then processed to measure phases that is then digitized. Ambiguity is resolved by finding the location in parameter space of the maximum of an ambiguity function related to sets of phase-measurement data. Position is determined at a point in time without keeping track of phase history.

29 Claims, 13 Drawing Sheets

INSTANTANEOUS RADIOPOSITIONING USING SIGNALS OF OPPORTUNITY

The U.S. Government has rights in this invention pursuant to Air Force Contract number F19628-00-C-0002 awarded by the Air Force's Electronic Systems Center, Hanscom AFB, Mass.

1. BACKGROUND OF THE INVENTION

1.1. Field of the Invention

This invention relates to improved techniques for determining position by radio, more particularly for determining position instantaneously, from carrier-wave phases of radio signals received from transmitters having different carrier-wave frequencies. In a preferred embodiment of the invention, these carrier waves also have random phases, and the position of a receiver is determined by reference to the phases of signals received by another, reference, receiver. The invention includes resolving, or reducing, the position ambiguity stemming from the integer-cycle ambiguity inherent in an observation of the phase of a periodic wave such as a carrier wave. Resolving ambiguity enables practically instantaneous position-determination, which is a substantial improvement over prior-art techniques based on sustained, continuous, carrier phase tracking.

1.2. U.S. Pat. No. 4,667,203; GPS; GLONASS

In U.S. Pat. No. 4,667,203 one of the present inventors (Counselman) discloses methods and systems for determining position from carrier-wave phases of radio signals received from a plurality of transmitters aboard earth-orbiting satellites such as those of the Global Positioning System (GPS). The disclosure of Counselman '203 includes methods and systems for resolving position ambiguity caused by the integer-cycle ambiguity of carrier phase. In a preferred embodiment of Counselman '203, the transmitted signals have random phases, and the position of a receiver is determined by reference to the phases of signals received at another, reference, receiver. However, Counselman '203 requires the transmitted signals to have suppressed carriers and/or wide, overlapping, spectra.

Counselman '203 does not teach or render obvious a technique for determining position from carrier waves transmitted with different frequencies. Counselman '203 does not teach or render obvious an instantaneous positioning technique. On the contrary, Counselman '203 teaches determining position by combining observations spanning a significant period of time, such as several thousand seconds.

In the Russian GLONASS system, which is otherwise very similar to GPS, different satellites transmit signals with slightly different implicit carrier frequencies. (Both the GLONASS and the GPS satellites transmit substantially overlapping spread-spectrum signals whose carriers are actually suppressed.) These slight carrier-frequency differences are intended to facilitate the separation of different satellites' signals in a receiver. An instantaneous radiopositioning method using combined GPS and GLONASS observations that includes resolving implicit carrier-phase ambiguities despite the GLONASS frequency differences is disclosed in a paper entitled "Single-epoch integer ambiguity resolution with GPS-GLONASS L1 data," by M. Pratt et al., appearing in the Proceedings of the Institute of Navigation Annual Meeting in Albuquerque, N. Mex., June 1997, pp. 691–699.

1.3. MITES

In an article entitled "Miniature Interferometer Terminals for Earth Surveying (MITES)", appearing in Bulletin Geodesique, Volume 53 (1979), pp. 139–163, by Charles C. Counselman III and Irwin I. Shapiro, there is proposed a system for determining position by measuring carrier-wave phases of multi-frequency radio signals received from a plurality of earth-orbiting satellites. The reason for having multiple frequencies is to resolve ambiguity and determine position instantaneously. However, the MITES scheme requires each one of the plurality of transmitters to emit the same multiplicity of different-frequency carrier waves. (Small frequency shifts and/or modulation are used to mitigate interference, as in the above-mentioned GLONASS system.) In other words, although Counselman and Shapiro teach the use of multiple frequencies, they teach that the multiple frequencies must be transmitted by each single transmitter; and that all transmitters should transmit the same frequencies.

1.4. Differential Measurements

The idea that all transmitters utilized in a radiopositioning technique should transmit the same or nearly the same frequencies is fundamental to many radiopositioning systems, including Loran and Omega (discussed below) in addition to GPS, GLONASS and MITES (discussed above). It is desired for all transmissions to be the same frequency band, or "channel," not merely to conserve spectrum, but fundamentally to facilitate differential measurements, i.e., measurements of differences between signals received from different transmitters.

1.5. Loran

The Loran system is described in an article by W. O. Henry, entitled "Some Developments in Loran," appearing in the Journal of Geophysical Research, vol. 65, pp. 506–513, February 1960. The current version of Loran, known as Loran-C, employs several-thousand-kilometer-long chains of synchronized transmitters stationed on the surface of the earth, with all transmitters having the same implicit carrier frequency, 100 kiloHertz, but with each transmitter emitting a unique time-sequence of short pulses. This sequence, which includes polarity reversals of the pulses, enables a receiver to distinguish between signals from different transmitters. A suitable combination of observations of more than one pair of transmitters can yield a determination of the receiver's position on the surface of the earth. Basically, a receiver observes the difference between the times of arrival of pulses from a pair of transmitters. Since the transmitters are synchronized, a time-difference-of-arrival (TDOA) observation implies that the receiver is located somewhere along a particular hyperbolic curve having vertices at the transmitters. (The locus of points having a given difference between their distances from two vertices is an hyperbola.) Observing TDOA for additional pairs of transmitters provides additional hyperbolic constraints on the receiver's position, and enables a unique position to be determined.

1.6. Omega

The Omega system is described in an article by Pierce, entitled "Omega," appearing in IEEE Transactions on Aerospace and Electronic Systems, vol. AES-1, no.3, pp. 206–215, December 1965. Omega, like Loran and conventional GPS, is an hyperbolic positioning system. In the Omega system, the phase difference between the radio waves received from different transmitters is measured rather than (principally) the time difference (TDOA) as in the Loran-C system. To facilitate resolution of phase ambiguity, Omega transmitters transmit plural frequencies. However, different transmitters transmit the same frequencies. Again, this is done to facilitate differential measurements.

1.7. Utilizing Signals of Opportunity

It is known in the radiopositioning art, i.e., the art of determining position by radio, to utilize signals of opportunity, by which we mean signals emitted by uncooperative transmitters. Typically such transmissions are not intended for positioning; different transmitters operate on wholly different frequencies; they are not synchronous; and their carrier-wave phases are random. Lack of synchronization or instability in time, frequency, and/or phase prevents many radiopositioning methods from being usefully employed.

An example of radiopositioning by utilizing signals of opportunity is determining position by radio direction finding (RDF) observations of commercial broadcast signals in the medium-frequency, amplitude-modulated (AM) broadcast band from about 550 to 1700 kHz. These signals are transmitted for purposes other than positioning, but the transmitters are marked and identified on nautical charts to facilitate their use as radio beacons, for navigation by RDF. Different AM broadcast transmitters within any given region of the country (or world) are assigned to completely separate, disjoint, frequency channels to avoid interference.

Another prior-art radiopositioning technique utilizing signals of opportunity tracks the phases of the carrier waves of signals received from commercial broadcasters in the medium-frequency AM broadcast band. By "tracking the phase of the carrier wave of a signal" we mean continuously or effectively continuously measuring the phase of the carrier wave with respect to a local reference oscillator; and keeping track of the time-variation of the measured phase from an initial time when the receiver's position was known, to a later time when the position is unknown and to be determined. Continuity of tracking is essential. If tracking were interrupted, the phase change during the hiatus would be unknown, so later positions could not be determined without resort to external information. This problem is discussed further in the following section.

In an article entitled "The CURSOR Radio Navigation and Tracking System," by Peter J. Duffett-Smith et al., appearing in the *Journal of Navigation*, vol. 45, no. 2, May 1992, pp. 157–165, an AM-broadcast-band carrier phase tracking system called "CURSOR" is described and the statement is made, "A drawback of a phase-measuring CURSOR system is its need to track the signals continuously from each radio transmitter. In many applications this is not a problem, but when used for vehicle tracking in cities there are always heavily-shadowed regions such as tunnels, underpasses, and petrol-station forecourts where the signals become too weak to track or disappear altogether. When the vehicle emerges from the shadow, the receivers lock themselves back on to the signals, but there is now an uncertainty equal to an integer number of wavelengths in the measured phases from each transmitter. Hence, the . . . [vehicle's] true position is no longer known. However, by using many more than the minimum three channels [i.e., broadcast stations], the solutions to the equations are constrained to the extent that only one of them is usually physically possible." (Op cit., at the bottom of page 163 and top of page 164.)

Thus, Duffett-Smith et al. disclose that phase-ambiguity can be resolved. Their method is not disclosed in enabling detail. It also seems not to have worked well for them, because they state (in the paragraph beginning at the middle of page 164), "A further drawback of a phase-measuring CURSOR system is the need to calibrate the system against known positions from time to time." Such recalibration is required in a phase-tracking system if only changes in position are being determined, from changes in phase, without an ability to determine position at any single time, i.e., instantaneously.

1.8. Instantaneous vs. Incremental Positioning

"Tracking" methods such as the one described by Duffett-Smith et al. are intrinsically incapable of instantaneous positioning. By "instantaneous positioning" we mean determining position at an instant, i.e., at a single point in time, as opposed to determining how a position has varied during the extended time interval since continuous tracking began, or last resumed. Tracking is an "incremental" positioning technique, as opposed to an instantaneous positioning technique.

Instantaneous positioning is advantageous, in comparison with incremental positioning, because tracking is subject to being interrupted for many reasons, including both deliberate and accidental reasons. An example of a deliberate reason is to conserve energy by keeping receiver power turned off until a position determination is required. This reason is important for battery-powered equipment. An example of an accidental interruption is that a vehicle carrying a tracking receiver enters a tunnel. Another, serious, disadvantage of incremental positioning is that errors are cumulative.

It is known to combine instantaneous and incremental radiopositioning techniques. For example, in an article entitled "Synergism of Code & Carrier Measurements," by Ron L. Hatch, appearing in the Proceedings of the Third International Geodetic Symposium on Satellite Doppler Positioning, pp. 1213–1231, Feb. 8–12, 1982, Las Cruces, N. Mex., a method of combining incremental position information derived by carrier-phase tracking, with instantaneous position information derived from "code" time-of-arrival measurements, is disclosed. Combining instantaneous and incremental positioning techniques may be advantageous when, as in the case described by Hatch, the incremental technique is more precise than the instantaneous technique.

By "position information" we mean data relating to position, from which position may be determined. An example of position information is TDOA measurement data. Another example of position information is carrier-phase measurement data. Position, per se, is usually expressed in position coordinates such as latitude and longitude, or northing and easting, relative to some origin or reference.

1.9. Reciprocity

Most radiopositioning techniques, including those of the present invention, may be "turned around"; i.e., one may determine the position of a transmitter, instead of or in addition to, the position of a receiver, from measurements of received signals. In relative-positioning techniques, such as in the present invention, determining the position of one receiver relies on having position information from a second receiver. This determination may be performed by combining data from both receivers at either receiver, or in a third place.

2. SUMMARY OF THE INVENTION

It is a general object of the present invention to provide improved techniques for determining position, or navigating, by radio.

A further object of the present invention is to provide improved techniques for instantaneous radiopositioning.

A more specific object is to provide improved techniques for radiopositioning utilizing radio signals received from different transmitters having, respectively, different frequencies.

A still more specific object is to provide improved techniques for radiopositioning utilizing radio signals received from different transmitters having random phases.

A specific object is to provide improved techniques for determining position by utilizing radio signals "of opportunity," i.e., signals emitted by uncooperative transmitters.

Yet another more specific object of the present invention is to provide improved techniques for resolving or reducing ambiguity in determining position by radio.

In a first aspect, the invention which achieves the foregoing objects, is a method of instantaneously determining an unknown position using radio signals from a plurality of transmitters having widely distributed and known positions and a wide range of radio frequencies. The method includes measuring the phases of the radio signals arriving concurrently at an unknown position to obtain a first set of phase-measurement data. The phases of radio signals arriving concurrently at a known reference position is measured almost simultaneously with their arrival at the unknown position to obtain a second set of phase-measurement data. The first and second data sets are combined to determine the unknown position.

In a preferred embodiment the radio signals arrive at the unknown position via ground-wave propagation from the plurality of transmitters which operate independently and whose radio signals are transmitted with random phases. In another embodiment, the first set of phase measurement data refers to a first instant of concurrent-signal-arrival at the unknown position and the second set of phase-measurement data refers to a second instant of concurrent-signal-arrival time at the reference position, and the departure from simultaneity of the first and second instants is determined simultaneously with the determination of the unknown position. It is preferred that position ambiguity be resolved by establishing an ambiguity function and finding the location of the maximum of the ambiguity function.

In another aspect, the invention is a radiopositioning system for instantaneously determining an unknown position. The system includes a plurality of spatially distributed transmitters at known locations, the transmitters transmitting signals at widely distributed frequencies. A first receiver is located at the unknown position and is adapted to receive the signals from the plurality of transmitters and to determine the phases of the signals at the unknown position to generate a first set of phase-measurement data. A second receiver is located at a known reference position adapted to receive the signals from the plurality of transmitters and to determine the phases of the signals at the known reference position to generate a second set of phase-measurement data. Computer apparatus operates on the first and second sets of phase-measurement data to determine the unknown position. In a preferred embodiment, the computing apparatus is programmed to find the location in parameter space of the maximum of an ambiguity function of the sets of phase-measurement data, the location of the maximum being the unknown position. It is preferred that the ambiguity function be a sum, over all of the transmitters, of a periodic function of the phase-measurement data. It is also preferred that the periodic function have a period of one phase cycle. Other appropriate functions are disclosed hereinbelow. It is also preferred that the output of the first and second receivers be a composite signal that is then digitized for processing.

3. BRIEF DESCRIPTION OF THE DRAWINGS

4. DETAILED DESCRIPTION OF PREFERRED EMBODIMENTS

FIG. 1.

Figure 1:
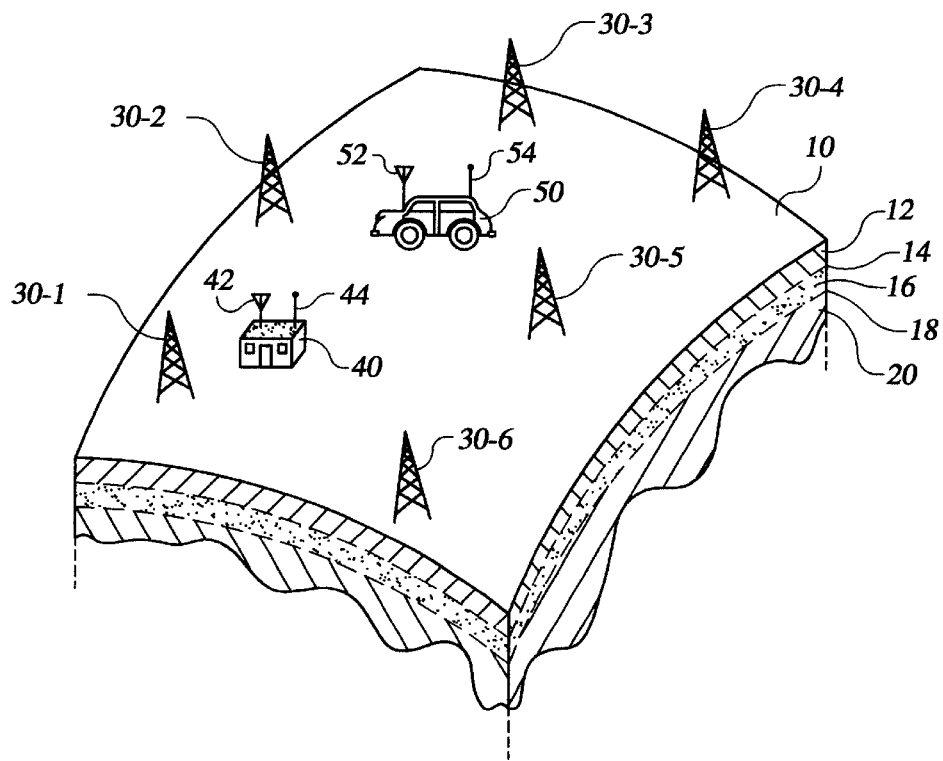
FIG. 1 is a schematic representation of a part of the earth including several fixed radio transmitters, a fixed reference station, and a vehicle bearing a radio receiver, whose position is to be determined.

Referring now to FIG. 1, there is shown (schematically, not to scale) a part of the earth's surface 10 and a plurality of subsurface layers 12, 16, 20 with interfaces 14, 18. Layer 12 could be unconsolidated soil; layer 16 could be dry rock; and layer 20 could be rock saturated by water. Interface 18 in this example would be the so-called water table.

In general these layers will have different electrical properties, characterized for example by different complex dielectric constants. These layers may or may not be uniformly thick throughout a geographic region; in other words, their interfaces 14, 18 may or may not be horizontal.

At various fixed and known locations in the geographic region shown in FIG. 1 are a plurality of radio transmitters, of which a representative set of six transmitters 30-1, 30-2, 30-3, . . . 30-6 are shown. In the preferred embodiment these are amplitude modulated (AM) broadcast transmitters operating in the AM broadcast band of frequencies from about 530 kHz to about 1700 kHz. Each transmitter has a unique carrier frequency, so its signal is readily distinguishable by frequency-selectivity in a receiver. The carrier is explicitly present in the signal as a continuous-wave component. On both sides of the carrier in the frequency domain are sidebands created by the amplitude modulation. In the United States, carrier frequencies are assigned by the Federal Communications Commission (FCC) and are constrained to be whole-number multiples of 10 kHz, with a tolerance of ±150 parts per million. The sidebands are limited to about ±5 kHz. In some other countries, carrier frequencies are assigned on 9-kHz multiples, and the bandwidth occupied by sidebands may be narrower. Generally the transmitters within a region are assigned to non-overlapping frequency channels to avoid interference.

The transmitters drive vertical antennas with respect to ground. The region of reception and utilization of their signals (not drawn) is preferably limited to a distance of several tens of kilometers. Within this region the signals propagate primarily in the so-called "ground wave" mode, which is predominantly vertically polarized. So-called "sky wave," or ionospherically reflected, signal components are relatively insignificant within this region, even at night when the ionosphere is not strongly absorbing. A ground-wave signal propagates radially outward horizontally from each transmitter 30. Wavefronts of the carrier-wave component of each said signal (not drawn) are essentially circular, centered on the transmitting antenna. The ground wavelength, i.e., the horizontal distance between wavefronts differing in phase by one cycle, is nearly equal to the speed of light in vacuum, c, divided by the respective carrier frequency in Hz. The precise wavelength depends on the detailed electromagnetic properties (mainly the conductivity and permittivity) and thicknesses of subsurface layers 12, 16, 20. Formulas and procedures for calculating the ground wavelength are known and are readily available in the technical literature of radio-propagation, e.g., in the IEEE Transactions on Antennas and Propagation, published by the Institute of Electrical and Electronics Engineers, New York, circa 1999. However, for most practical purposes, over distances of the order of kilometers, it is sufficient to adopt the vacuum wavelength. If necessary, more exact values of ground wavelength may be determined by traversing the region and simultaneously measuring ground-wave phases (e.g., as disclosed herein) and position, position being determined by independent means such as GPS.

Also within the geographic region shown in FIG. 1 are a fixed reference station 40 and a vehicle 50. The location of fixed reference station 40 is known. The location of vehicle 50 is unknown and to be determined. It will be determined by reference to data from carrier-phase measurements at fixed reference station 40. In principle, reference station 40 could also be a moving vehicle. In this case, independent means such as GPS could be used to determine its position at any time. Also in principle, if reference station 40 and vehicle 50 were widely separated, it would be possible to determine the positions of both simultaneously by extending the techniques of the present invention. However, simultaneous estimation of two unknown positions rather than one would require substantially more computing time to resolve ambiguity, and is therefore not preferred.

It would be a straightforward matter to utilize data from a plurality of reference stations similar to reference station 40 to determine the position of vehicle 50. This would be preferred, for example, if it could occur that vehicle 50 drove out of range of one reference station 40. An extensive geographical area might be served by an extensive network of reference stations 40.

In the preferred embodiment of the invention, data are telemetered from reference station 40 to vehicle 50. In a non-real-time version of the invention, means for telemetering data between reference station 40 and vehicle 50 are omitted, and data from both are stored and combined for processing later, e.g., after vehicle 50 has returned to reference station 40.

As shown in FIG. 1, reference station 40 has a vertical antenna 42 adapted for receiving the ground-wave signals from transmitters 30. Reference station 40 also has a transmitting antenna 44 adapted for transmitting data to vehicle 50. Vehicle 50 has a vertical antenna 52 adapted for receiving the ground-wave signals from transmitters 30, and also an antenna 54 for receiving data from antenna 44 at reference station 40.

A skilled radio practitioner knows how to multiplex an antenna and use it simultaneously for both transmitting and receiving, or for receiving multiple signals, in very different frequency bands, simultaneously. Thus, for example, antennas 42 and 44 could conveniently be combined; and antennas 52 and 54 could conveniently be combined. Reference station 40 could also be merged with a transmitter 30. A plural subset of the plurality of transmitters, e.g., transmitters 30-1 and 30-2, could be merged. In other words, two or more signals, with different carrier frequencies, could be transmitted from one antenna 30. This is in fact a common practice in the United States.

Preferably the transmitters 30 are located in a wide range of directions as viewed from vehicle 50 and antenna 52; ideally, the transmitters more or less surround vehicle 50 and antenna 52. However, it is not important for the transmitters to be uniformly distant or uniformly spaced azimuthally (i.e., around the horizon). Preferably, the different frequencies of these transmitters span a wide range of frequencies, and have a wide range of spacings from narrow to wide. Preferably, the transmitter frequencies are distributed substantially independently of the transmitter positions. For example, it would be undesirable for all of the lower-frequency transmitters to be in one direction, and all of the higher-frequency transmitters to be in an orthogonal direction. These are general and somewhat "soft" preferences. In practice, the distribution of AM broadcast stations around a typical U.S. metropolitan area is satisfactory. If the distribution were poor, this would be evident in the appearance of the "ambiguity function" to be described hereinbelow. If the distribution were very poor it could be remedied by placing supplementary, low-power, unmodulated, continuous-wave transmitters within the region of interest.

Often an AM broadcast station has an antenna comprising a plurality of towers operating as elements of a directional array antenna. That is, each tower of the array is excited with the same frequency, but different amplitudes and phases so as to form a beam of radiation or to avoid radiating in a particular direction. For the purposes of the present invention these multiple towers may be treated separately or they may be represented by a single-point antenna at the phase-center of the array. The latter method is satisfactory if receiving sites 40 and 50 are in the far field of the array.

FIG. 2.

Figure 2:
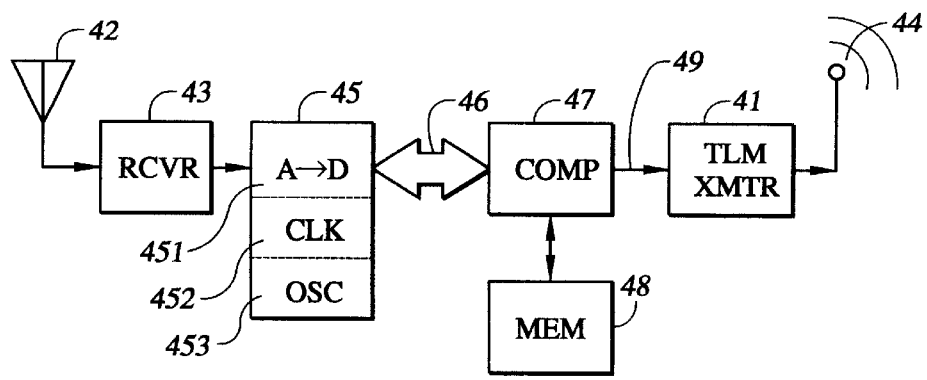
FIG. 2 is a block diagram showing in more detail system components located at the fixed reference station shown in FIG. 1.

Now referring to FIG. 2, the components of our preferred embodiment located at reference station 40 are seen. Station 40 includes an antenna 42 connected to a receiver 43 for receiving the signals from all of the plurality of transmitters 30-1, 30-2, 30-3, . . . 30-6, etc., simultaneously. Receiver 43 applies a composite of all of these simultaneously received signals to an analog-to-digital-converter unit 45 such as the model PCI-416D2 made by Datel, Inc., Mansfield, Mass. This unit plugs into the standard PCI bus 46 of an Intel-based personal computer, or "PC," 47. Computer software and data are stored in memory 48 which is preferably a hard-disk drive. A software package, Datel PCI-416NTS, running under a Microsoft Windows operating system on computer 47, drives analog-to-digital-converter unit 45. Included in unit 45 are a crystal oscillator 453 which governs the sampling frequency of analog-to-digital-converter 451 and the rate of clock 452 which controls when sampling starts and stops. The sampling frequency and the start and stop times are set via the driver software running in computer 47. The entire AM broadcast band is digitized directly (without downconverting) at 5 Million samples per second, with 12 bits per sample.

Subsequent radio signal processing and measurement functions are performed via software in computer 47. In our preferred mode of operation, a burst of $2^{22}$ (about 4 Million) samples is taken and processed every five seconds. The $2^{22}$ length data burst spans approximately 0.8 second. The computer performs a $2^{22}$ length Fast Fourier Transform (FFT) of this time-series of samples. The resulting complex-amplitude spectrum has resolution of about 1.2 Hz. The magnitude of this spectrum is searched in the vicinity of the assigned frequencies of the AM broadcast stations 30 to find the very narrow peaks corresponding to the carrier waves transmitted by these stations. By interpolation of the points on each peak, the frequency, phase, and magnitude of each carrier signal is estimated. The estimated carrier frequency is simply the frequency of the interpolated peak magnitude of the Fourier transform. The estimated phase and magnitude are simply the angle and the magnitude of the complex amplitude of the Fourier transform at this frequency. These estimates, which we call "measurement data," are stored in memory 48, tagged with the time of the sample-burst as indicated by clock 452.

These time-tagged-measurement data are transmitted by telemetry transmitter 41 in near real time, with as little latency as possible. Included with the measurement data in this transmission are position-coordinate data representing the (known) positions of all transmitters 30 and of the reference station 40. The latter data are read from memory 48 by computer 47 and merged with the local received-carrier-measurement data; and the composite data message is applied by computer 47 via line 49 to transmitter 41.

In summary: at reference station 40 the amplitudes, frequencies, and phases of the carrier waves received from all available transmitters 30 are measured at times governed by clock 452; and the time-tagged measurement data are transmitted via transmitter 41 and antenna 44 to vehicle 50.

FIG. 3.

Figure 3:
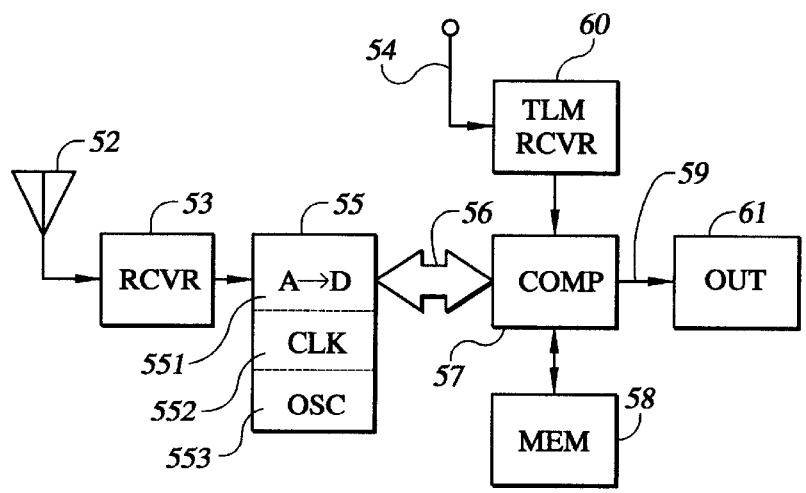
FIG. 3 is a block diagram showing in more detail system components located at the vehicle shown in FIG. 1.

In FIG. 3, system components located at vehicle 50 are seen. Vehicle 50 includes an antenna 52 for receiving the signals transmitted by all transmitters 30–1, 30–2, 30–3, . . . 30-6, etc., and an antenna 54 for receiving the data transmission from reference station transmitter 41 shown in FIG. 2. Vehicle antenna 52 should be electromagnetically similar, and preferably is identical, to reference station antenna 42 shown in FIG. 2. As mentioned, a single antenna may be multiplexed to perform the functions of both vehicle antennas 52 and 54.

The signals sensed by antenna 52 are applied to receiver 53 which should be similar, and preferably is identical, to reference station receiver 43 shown in FIG. 2. Similarly, vehicle 50 is equipped with analog-to-digital-converter unit 55 which is like analog-to-digital-converter unit 45 shown in FIG. 2. Analog-to-digital-converter unit 55 includes analog-to-digital-converter 551, clock 552, and oscillator 553 which are like their counterparts 451, 452, and 453 shown in FIG. 2. Again similarly, vehicle 50 is equipped with a computer 57, bus 56, and memory 58, which are like their counterparts 47, 46, and 48 shown in FIG. 2. However, instead of a telemetry transmitter and antenna, vehicle 50 is equipped with a telemetry receiver 60 and antenna 54.

If desired, both a telemetry transmitter and a telemetry receiver could be included at each location 40 and 50. In this case, it would be possible at either site to determine the unknown position(s).

Computer 57 is equipped with an output device 61, such as a video display, for displaying position-determination results.

For the signal received from each transmitter, vehicle receiver 53, analog-to-digital-converter unit 55, and computer 57 and its peripherals operate to measure, exactly as their counterparts at reference station 40 do, the amplitude, frequency, and phase of the carrier wave received from each of the plurality of transmitters 30. The resulting measurement data, time-tagged at vehicle 50 with the sample-burst times indicated by clock 552, are stored in memory 58. In our preferred mode of operation, this is done every five seconds at vehicle 50, just as it is done at reference station 40. However, each five-second sampling "epoch" stands on its own, and position is determined at each such epoch "instantaneously," without needing data from any other epoch. There is no requirement for continuous tracking of the carrier signals.

The sampling epochs occur preferably on integer minutes and at 5, 10, 15, . . . seconds thereafter. Computer 57 approximately synchronizes itself and clock 552 with the computer 47 and clock 452 at the reference station via the telemetry transmission it receives via antenna 54 and telemetry receiver 60. This synchronization is inexact, but is easily kept within less than 100 microseconds, or the time required for a radio signal to travel about 30 km.

In addition to the measurement functions just mentioned, computer 57 performs the numerical and logical calculations necessary to determine the position of vehicle 50 with respect to the known position of reference station 40 shown in FIG. 2. The details of these calculations are given below in the section entitled "Computation of instantaneous position" and in several following sections. Because of this additional computing burden, if a new position determination will be desired for every five-second epoch, vehicle 50 should be equipped with more computing "horsepower" than reference station 40, where (in our preferred embodiment) no position computation is done. Alternatively, a position may be computed less often in real time, and/or measurement data may be accumulated and processed later.

FIG. 4.

Figure 4:
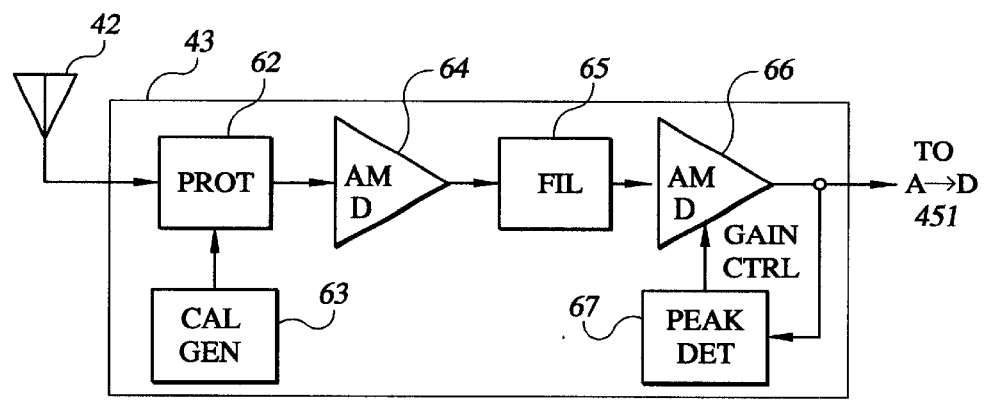
FIG. 4 is a block diagram showing components of the receiver located at either the fixed reference station or the vehicle.

In FIG. 4 are seen the components of receiver 43, which is shown in FIG. 2. Receiver 53, shown in FIG. 3, is preferably identical. Antenna 42 is connected to protective circuit 62 which protects the following circuits of the receiver from being damaged if a powerful transmitter operates near antenna 42. Protective circuit 62 also receives a receiver-calibration signal from calibration signal generator 63. The signals received by antenna 42 plus this receiver-calibration signal are amplified by a buffer amplifier 64, such as Analog Devices integrated-circuit type BUF04, then filtered by a band-limiting filter 65. This filter provides anti-aliasing for the subsequent 5 M/second sampling by analog-to-digital-converter 451 shown in FIG. 2. In our preferred embodiment, filter 65 is a eight-pole Butterworth low-pass type with a cutoff frequency of 2 MHz, made by Allen Avionics, Inc., Mineola, N.Y. However, a simpler filter could be substituted.

The output of filter 65 is amplified by variable-gain amplifier 66, whose output is applied to analog-to-digital-converter 451 shown in FIG. 2. In our preferred embodiment, amplifier 66 uses a cascade of three Analog Devices type AD844 integrated-circuit high-speed operational amplifiers, each with its feedback resistor switched by a reed relay, or two. The voltage gain of each of the first two stages can be switched to either 1 or 4, and the gain of the third stage can be switched to 1, 2, 4 or 8. Thus the gain can be varied in 6-dB steps over a range of about 42 dB. The gain-control relays are switched in response to peak detector 67 which measures the peak absolute value of the output of amplifier 66. The gain control operates to keep the peak absolute value of the voltage applied to analog-to-digital-converter 451 within ±3 dB (a factor of 0.7 to 1.4) of 1 volt. The saturation voltage of the converter is ±2.5 volts. The gain is switched in between sampling bursts.

FIG. 5.

Figure 5:
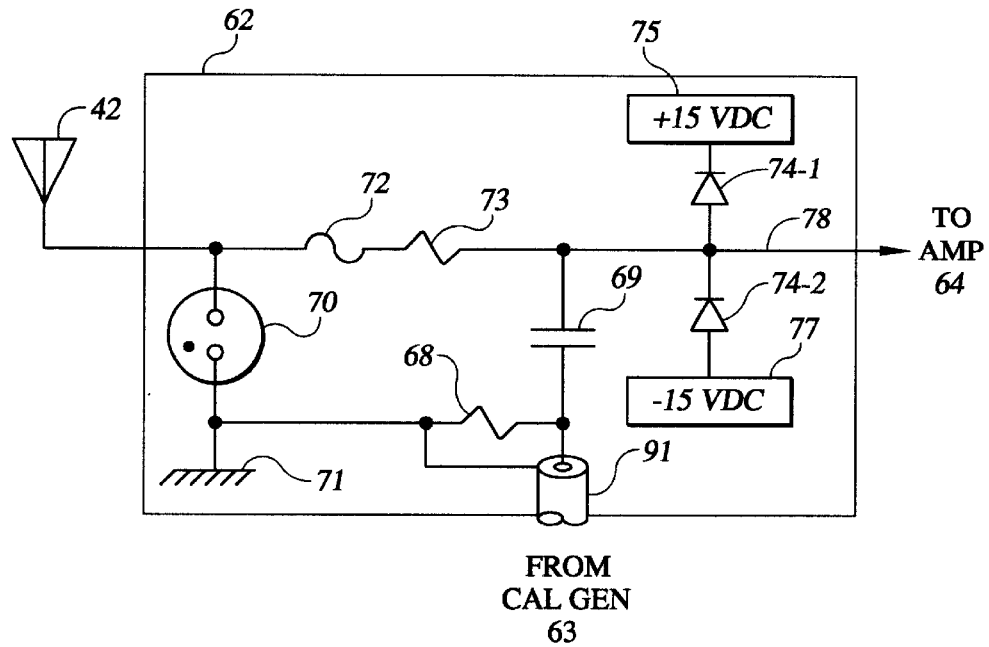
FIG. 5 is a block diagram showing components of input-protection circuitry within either receiver.

In FIG. 5 the components of protective circuit 62 are seen. The antenna 42 is connected to one terminal of a neon lamp bulb 70, such as Chicago Lamp type C2A, whose other terminal is connected to receiver ground 71. The antenna 42 is also connected through a small fast-acting fuse 72, such as Littlefuse type 273125, and a 500-ohm, 30-watt resistor 73 such as Caddock type MP930, to the input of buffer amplifier 64. The voltage input to buffer amplifier 64 is limited by fast, low-capacitance diodes 74-1 and 74-2, such as Motorola type MBD701, connected to positive and negative 15-volt buses 75 and 77, respectively. This protective circuit is very robust, yet it loads the input of amplifier 64 with very little capacitance.

As mentioned, a receiver-calibration signal from calibration generator 63 is also applied to protective circuit 62. This signal comes via 50-ohm coaxial cable 91, which is terminated by 51-ohm resistor 68. The signal is coupled to the input of amplifier 64 via 10-pf capacitor 69.

FIG. 6.

Figure 6:
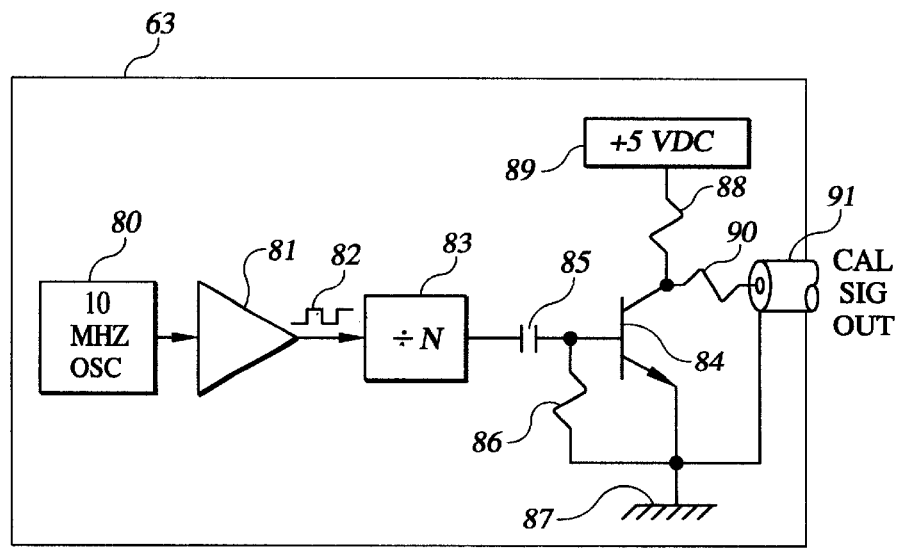
FIG. 6 is a block diagram showing components of a calibration signal generator within either receiver.

In FIG. 6, the components of calibration generator 63 are seen. A sine-wave signal from a 10-MHz crystal oscillator 80 is amplified and clipped by a voltage comparator 81, such as Linear type LT1016, to produce a square-wave, logic-level, signal 82, which is divided in frequency by a factor of 498 in divider 83. Divider 83 is a synchronized flip-flop cascade configured as a preset counter, preferably assembled from MC74AC 109 and 74AC161 integrated circuits. The frequency that it generates, equal to 10 MHz divided by 498, or about 20080.321285 Hz, is incommensurate with the 10-kHz carrier-frequency spacing, so harmonics of this signal do not interfere with carrier phase measurement.

The square-wave output of divider 83 is coupled to the base of a bipolar junction transistor 84, such as Motorola type MMBR901LT1, by a 33-pf capacitor 85. The transistor base is also connected to ground 87 through a 33-ohm resistor 86. This RC circuit acts as a differentiator so that the transistor 84, normally biased off, is switched on for a very short time, of the order of a few nanoseconds, by the positive-going transitions of the divider 83 output. The collector of the transistor is connected to a ±5 volt supply 89 by a 100-ohm resistor 88. The very short pulses appearing at the collector are coupled to coaxial cable 91 through a 51-ohm resistor 90. Cable 91 carries the 20080.321285-Hz impulse train to the receiver-input protective circuit 62.

The spectrum of this impulse train is a comb of impulses, or harmonics of 20080.321285 Hz, in the frequency domain. The FFT-based software running in computer 47 detects and measures the phases of these harmonics just as it measures the broadcast-station carriers.

For calibration of the receiver it is not necessary to know the phase or the exact frequency of oscillator 80, because the phase of this oscillator appears as a pure time delay in the spectrum of the calibration signal. A time delay of the receiver is completely absorbed in the estimate of the sampling-clock synchronization error that is made in the course of position estimation, as described below. A time delay appears as a linear phase-vs.-frequency characteristic. Only the departure from linearity is important.

In practice we find that the receivers that we constructed as described above are so nearly identical that phase calibration is unnecessary. Phase calibration could easily become important, for example if simpler filter and amplifier circuits were substituted or if the two receivers had different designs. Phase calibration could also be more important if a repeater were used as discussed below in relation to FIG. 16. In any case, the phase calibrator is useful as a test signal.

Computation of Instantaneous Position

We now describe, with the aid of detailed mathematical formulas, the computation which completes an instantaneous position determination.

As already described, at convenient epochs (e.g., every five seconds on the zeros and fives) the phase, frequency, and amplitude of each received carrier signal are measured for all observable transmitters at reference station 40, whose position is assumed known. In the following we will refer to this station as the "base," and in formulas we will designate it by a subscript b. Similarly, all observable carrier signals are measured almost simultaneously, but t seconds later, at vehicle 50, which we will call the "rover" and will designate by a subscript r. The time-interval t represents the so-far-unknown departure from exact synchronization of the two sampling clocks (452, 552), plus any difference between the time-delays of the respective receivers (43, 53).

The two-dimensional, horizontal, position coordinates (xy) of the rover with respect to the base, and the epoch offset, t, are determined by computing an "ambiguity function" from these measurements, and finding the maximum of this function. This computational method is modeled on those disclosed in the Counselman '203 patent and in the earlier article entitled "Miniature interferometer terminals for earth surveying: ambiguity and multipath with GPS," by C. C. Counselman III and S. A. Gourevitch, appearing in *IEEE Transactions on Geoscience and Remote Sensing*, vol. GE-19, pp. 244–252, October 1981.

In the following formulas, all positions including those of all transmitters 30 are expressed in Cartesian coordinates (x, y) with origin at the known "base" position. Phase is defined to be an increasing function of time, such that the phase of a carrier wave decreases with increasing distance from the transmitter.

The measured carrier phases from the two receivers are differenced for transmitter, j, where j is an index that ranges over all transmitters observed by both receivers:

$$\theta^j = \theta_r^j - \theta_b^j$$

If a transmitter was observed at just one receiver, it is disregarded. The set of transmitters used is also limited to those located within about 50 km of both receivers, in order to minimize skywave interference. However, during daytime, powerful (about 10 kW or more) stations as far away as about 100 km are useful. A list of the FCC-assigned carrier frequencies, transmitted powers, details of antenna towers, and position coordinates of all AM broadcast transmitters within a user-chosen radius of a user-chosen position is conveniently obtained from the FCC's license data base via the Internet at the URL <http://www.fcc.gov/mmb/asd/amq.html#sprung5>.

A trail set of values $\hat{x}$, $\hat{y}$, and $\hat{t}$ of the unknowns x, y, and t is now chosen from within the three-dimensional (x, y, and t) search "volume" or "space" that we shall define below. This volume encompasses all reasonably possible values of the unknowns. A three-dimensional grid of trial values filling this volume will be tried. From the set of trial values a theoretical phase difference $$\hat{\theta}^j(\hat{x},\hat{y},\hat{t}) = \hat{\theta}_r^j(\hat{x},\hat{y},\hat{t}) - \hat{\theta}_b^j$$

is computed for each transmitter j, where $$\hat{\theta}_r^j(\hat{x}, \hat{y}, \hat{t}) = -\frac{1}{K_b^j}\sqrt{(\hat{x}-x^j)^2 + (\hat{y}-y^j)^2} + \omega_b^j \hat{t}$$

and $$\hat{\theta}_b^j = -\frac{1}{K_b^j}\sqrt{(x^j)^2 + (y^j)^2} \ .$$

In the above formulas, $\omega_b^j$ is the radian frequency of transmitters as observed by the base receiver. By radian frequency we mean $2\pi$ times the frequency in Hz.

$$K_b^j = \frac{c}{\omega_b^j}$$

is the wavenumber of transmitters where c is the speed of light. If more accurate information on the actual wavenumber of the ground-wave within the region of interest is available, it should be used here.

Notice that the so-called "theoretical" phase difference $\hat{\theta}^j(\hat{x},\hat{y},\hat{t})$ depends on a measured frequency.

If and when the trial values $(\hat{x},\hat{y},\hat{t})$ equal the actual, true, but so far unknown values of (x, y, t), and if errors of measurement are neglected, then the theoretical phase difference $\hat{\theta}^j(\hat{x},\hat{y},\hat{t})$ will equal the measured phase difference $\theta^j = \theta_r^j - \theta_b^j$, modulo $2\pi$; that is, the theoretically computed and the actually measured phase difference will differ by an integer number of cycles. This integer represents the phase ambiguity.

The ambiguity function is computed from the theoretical and the actually measured phase differences as follows:

$$R(\hat{x}, \hat{y}, \hat{t}) = \sum_{j=1}^{J} W_r^j \cos(\theta^j - \hat{\theta}^j(\hat{x}, \hat{y}, \hat{t})).$$

The ambiguity function is a weighted sum, over all included transmitters, of cosines of the theoretical-minus-measured phase difference for each transmitter. Because the cosine function is periodic with period $2\pi$, the phase ambiguity drops out. The weights, $W_r^j$, are chosen to give more weight—but hopefully not too much—to stronger stations than to weaker ones. We set them proportional to the received signal strength, in dB relative to the weakest station included, of transmitter j as observed by the roving receiver. The weights are normalized so they sum to one. Thus, in the absence of measurement errors the ambiguity function will equal one when correct trial values are chosen. When the maximum of the ambiguity function is found by searching the unknown-parameter space, this maximum value indicates the "goodness" of the position determination. At the estimated position and time, the (unweighted) values of the individual cosines indicate the "goodness" of the observations of individual transmitters. Outliers, or bad observations, should be unweighted and the maximization repeated.

To further explain the invention and some alternative embodiments we now present some actual observations, ambiguity functions actually computed, and instantaneous positioning results obtained in actual practice with the invention.

An instantaneous radiopositioning system constructed and operated in accordance with the invention was demonstrated to work well in actual practice, in various places in the Boston, Mass., metropolitan area. This actual system was a non-real-time system lacking the telemetry transmitting and receiving features (transmitter 41 and antenna 44 in FIG. 2; receiver 60 and antenna 54 in FIG. 3) of the preferred embodiment disclosed above. In the actually constructed system all measurement data were stored in real time on the computers' hard disks (48, 58). Then after the roving vehicle 50 had returned to the reference station 40 a temporary Ethernet connection was made between the two computers (47, 57); data were copied from one to the other; and the latter computer performed the ambiguity-resolving, position-determining computation. Also because no telemetry link was available, the sampling clocks (452, 552) in the analog-to-digital converter units (45, 55) plugged into the two (reference station 40 and vehicle 50) computer systems (47, 57) were synchronized by means of a temporary cable connection between the two systems before the vehicle 50 left the reference station 40.

FIG. 7.

Figure 7:
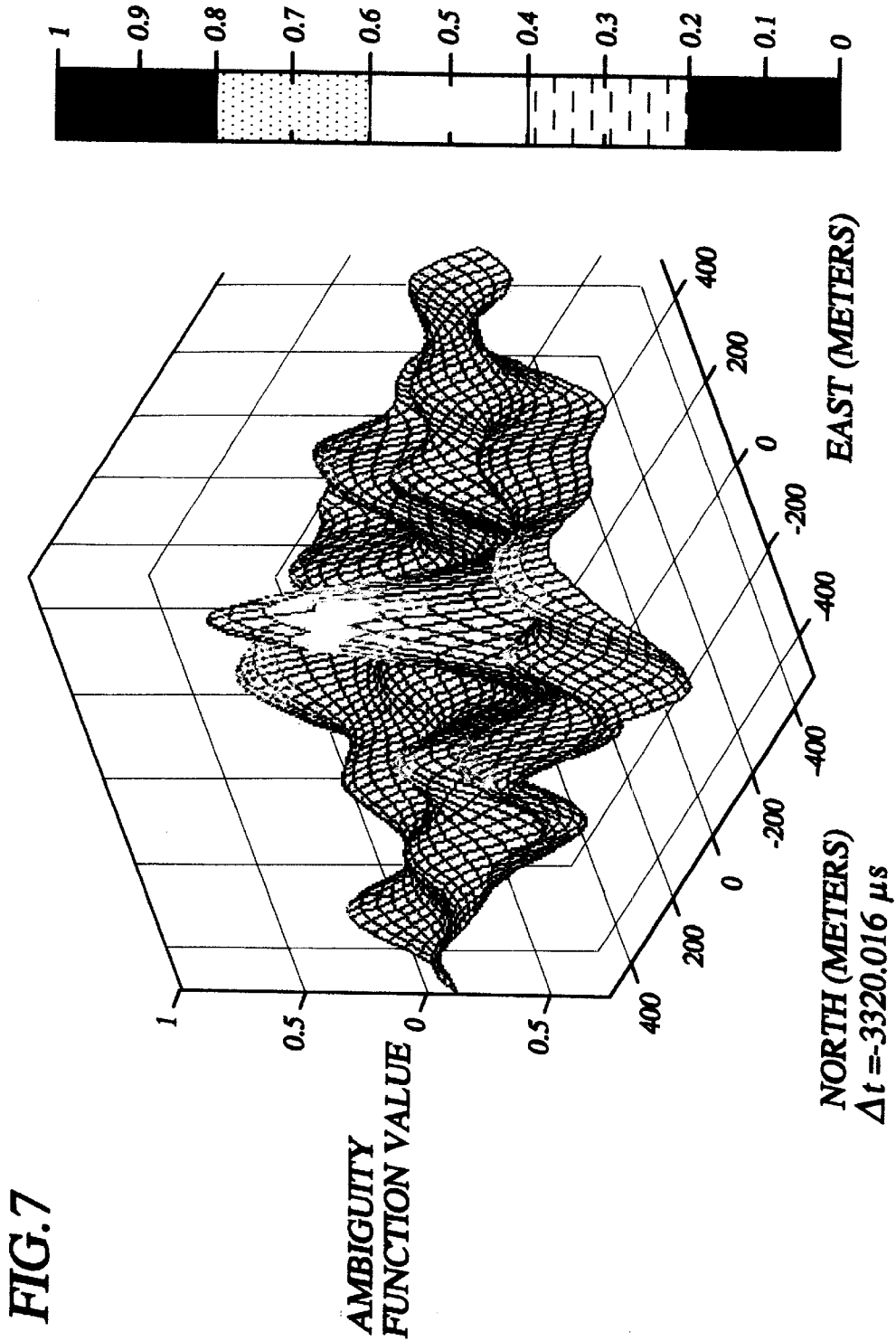
FIG. 7 is a plot of an ambiguity function which is maximized to determine instantaneous position.

FIG. 7 is a "ruled-surface" plot of the ambiguity function computed on a grid covering one square kilometer of x and y, for the best-estimated, virtually correct, value of t. The data used in this case are from one instantaneous (0.8-second) observation with the rover 50 and base 40 just two meters apart. With such a small separation, errors are rather small.

The plot shows a towering peak at the correct position of the roving receiver (very near the origin). The peak value of the ambiguity function is 0.99. Other local maxima do not exceed 0.4, so the correct position is clear. Note that negative values of the ambiguity function are plotted in the same dark gray shade as the lowest positive values.

FIG. 8.

Figure 8:
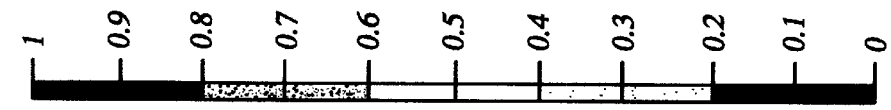
FIG. 8 is a plot of the same ambiguity function as FIG. 7, but over a 100-times-greater area.
Figure 8:
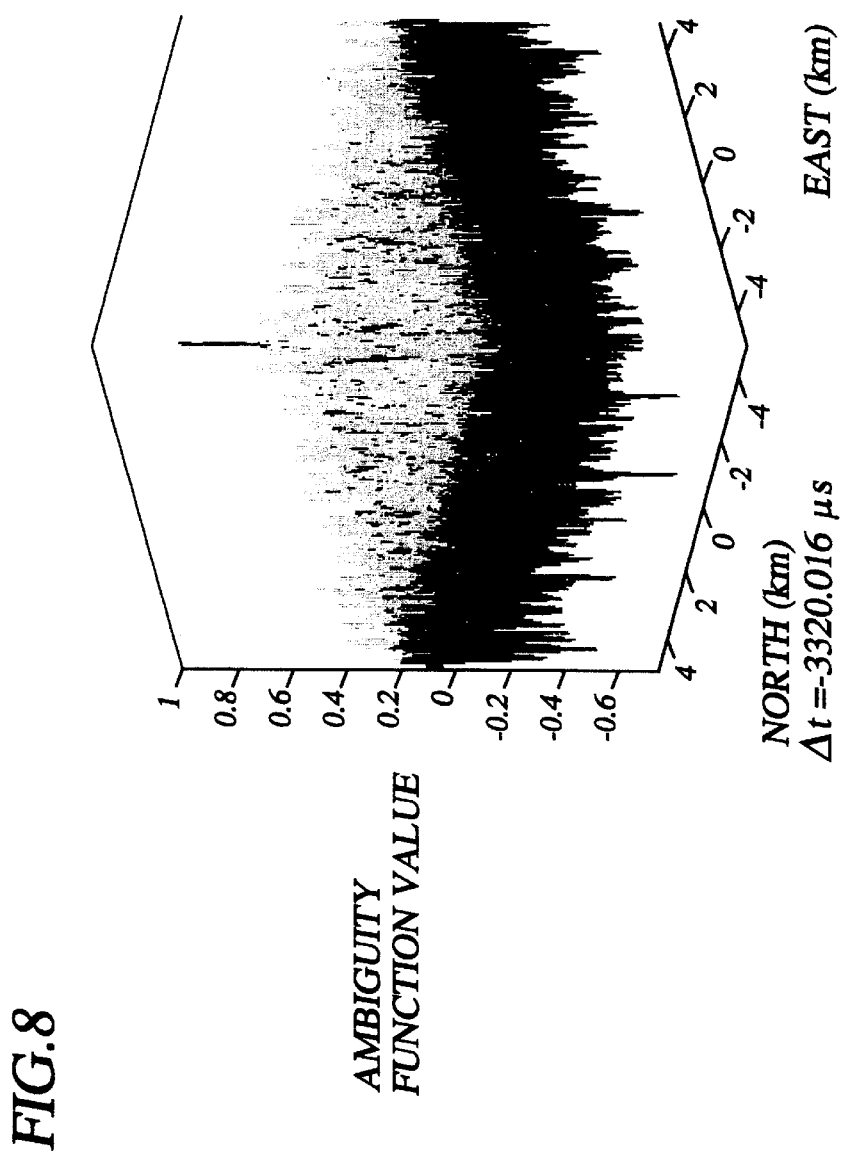

FIG. 8 is like FIG. 7 but the plot area is increased to 100 square kilometers. Extending the plot area reveals local maxima as high as almost 0.6, but the 0.99 maximum near the origin is still unique and quite distinct.

FIG. 9.

Figure 9:
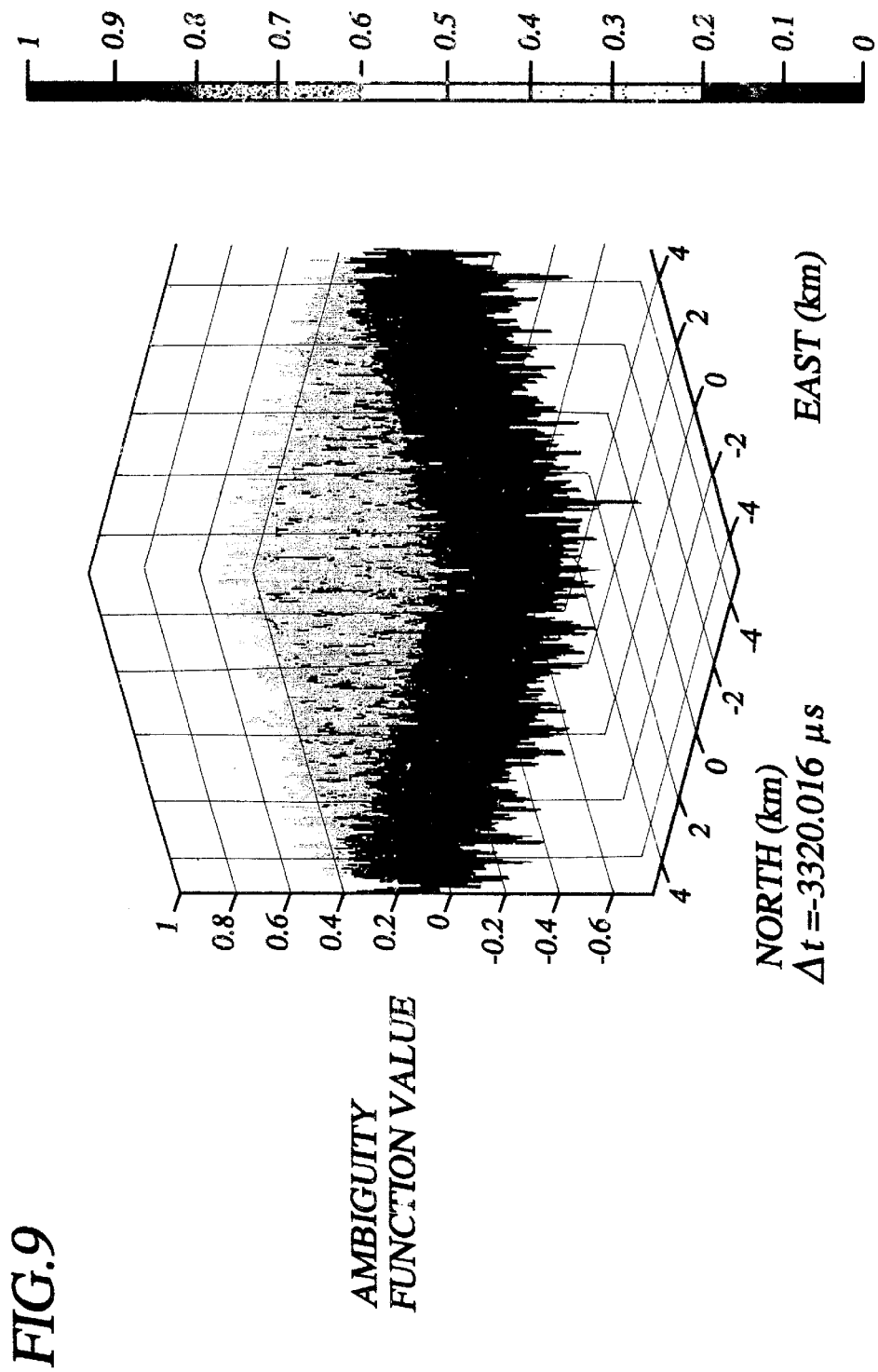
FIG. 9 shows a plot of the same ambiguity function, over the same 100-square-km area as FIG. 8, but with a slightly incorrect assumption regarding clock synchronization.

FIG. 9 is like FIG. 8 but the trial value of the synchronization departure, t, is deliberately offset by a small amount. As desired, no peak above 0.6 occurs in FIG. 9. However, it should be noted that for our currently working system, the ambiguity function is nearly periodic in t with period 100 µs. This periodicity is due to the common factor of 10 kHz in all the carrier frequencies observed. The envelope of the 100 µs-periodic peaks is slightly modulated due to actual transmitter frequency deviations from whole-number multiples 10 kHz harmonics, but in practice this modulation does not sufficiently distinguish the correct value of t. Therefore the receiver clock offset must be known a priori to within 100 µs of the correct value. In our preferred real-time system, the required level of synchronization knowledge is easily provided by the telemetry link. In a post real-time system like the one we have actually built, the problem is more complicated.

One solution is to observe the modulation sidebands of one or more transmitters at both receivers, and to crosscorrelate these signals to determine their group-delay difference. Since the Fourier transforms of the received signals are already available in the computers, the portions of the transform data corresponding to the chosen sidebands may be cross-multiplied to obtain the cross-power spectrum, whose transform is the crosscorrelation function. Providing, of course, that the observations overlap in time and frequency, the time of the peak of the crosscorrelation function indicates the receiver clock offset.

Another possibility is to measure the frequency, phase, and amplitude of each of several of the strongest peaks in the modulation sidebands of a few strong radio stations at each receiver—just as if they were carrier waves. The long correlation times and distinct spectral features that characterize music and voice modulation insure a reasonable amount of overlap between the observations at each receiver. If both receivers report observations of some of the same spectral peaks, these observations can be used in the ambiguity function precisely as additional carrier observations would be used. Because the frequencies of the modulation spectral peaks will be randomly spaced, the observations will not contribute to the 100 µs periodicity and therefore, t can be unambiguously estimated.

We chose a simpler approach in our demonstration experiments. At the beginning of each experiment, a pulse from a serial port of one of the computers was injected into both receivers' antenna terminals. Each receiver observed the offset from its own start-of-sampling epoch to this common pulse. The clock offset was computed by subtracting these observations. Subsequent values of the clock offset were predicted well within the required accuracy by using the ratio of the observed frequencies of a particular transmitter at each receiver to indicate the ratio of the rates of the two clocks.

It is not practical to search every position on earth for the maximum of the ambiguity function. In GPS positioning, this problem is usually solved by centering the ambiguity-function search on the C/A-code-based position estimate. For AM navigation, other possibilities exist. Because of the close proximity of the transmitters, the received power observations can be used to initialize the search. We have not tested this method yet. We simply search a square kilometer area centered on the base station position. The receiver clock offset, t, is searched over a 100 µs window centered on the a priori estimate. We use a step size in x, y, and t that is ten percent of the shortest wavelength, or shortest period, in the AM band.

In the following figures we present results from demonstration experiments in which position was determined by maximizing the ambiguity function at each and every epoch, independent of all other epochs.

In one experiment the base receiver was placed at a GPS-surveyed position in the driveway of co-inventor Counselman's home. The rover was placed on a teacart and rolled to three waypoints in a nearby street. For comparison with the AM-broadcast-based, instantaneous-positioning results, the distances and directions of the waypoints were determined by means of a tape-measure and the directions of shadows of a pencil, cast by the sun. (We estimate that the latter survey was uncertain by a few meters.)

FIG. 10.

Figure 10:
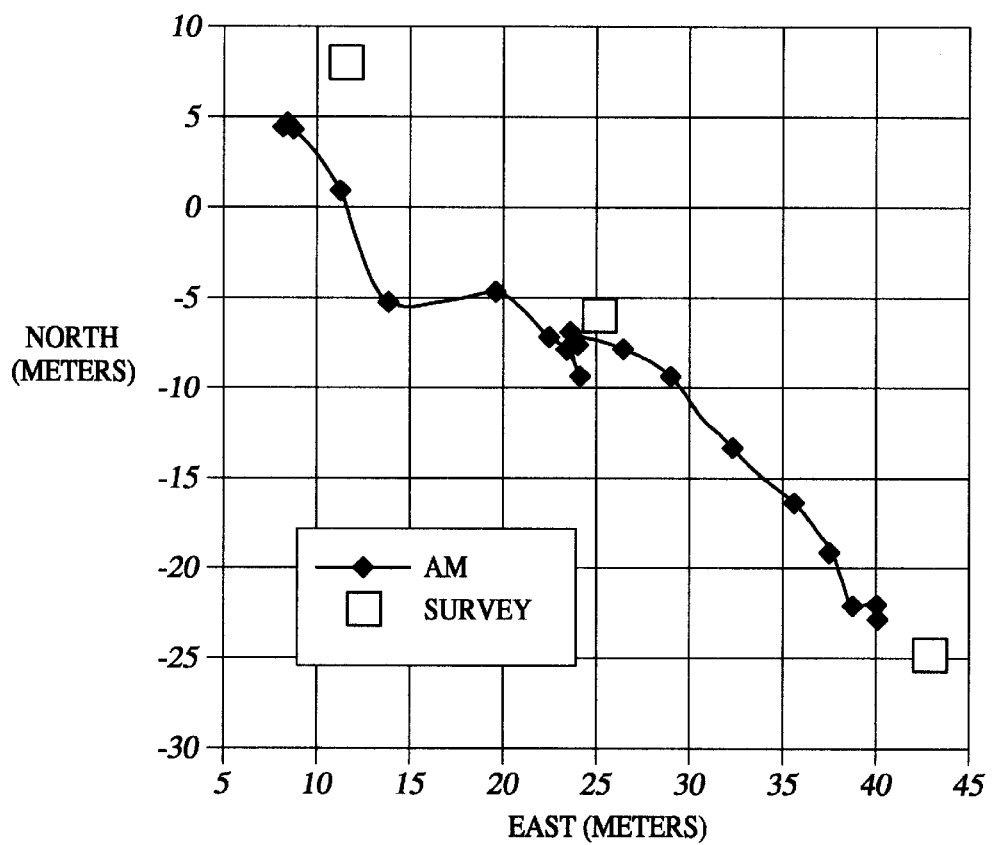
FIG. 10 is a scatter plot of positions determined in a short-distance demonstration of the invention.

FIG. 10 is a scatter plot of all of the positions determined in this experiment. The diamonds, plotted with a line connecting them, show the rover positions determined by maximizing the ambiguity function independently at each 5-second observation epoch. Tight clusters of overlapping diamonds appear where the rover stopped at each waypoint. The waypoint positions determined by the tape-and-shadow survey are marked by gray squares. The diamond clusters are at most five meters from the squares. Five meters is about 2.7% of the shortest carrier wavelength observed.

FIG. 11.

Figure 11:
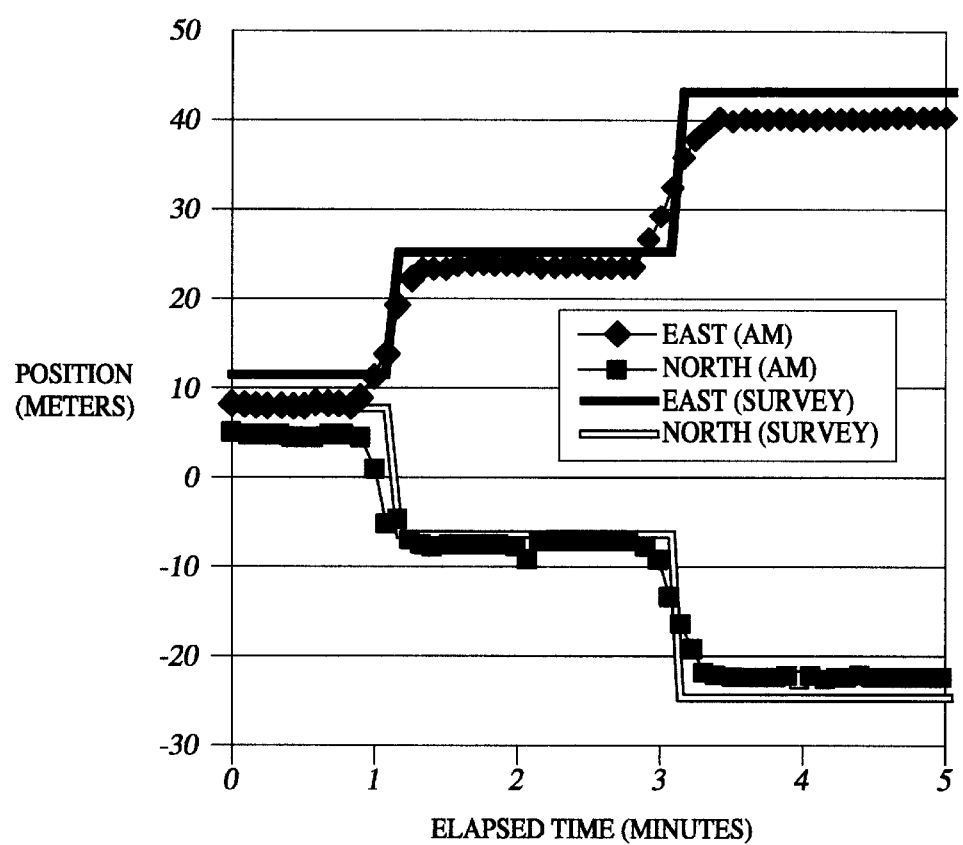
FIG. 11 is a plot, versus time, of positions determined in a short-distance demonstration of the invention.

FIG. 11 shows the same positioning results plotted versus time. The AM-broadcast-based positions determined independently every 5 seconds are plotted with diamonds for x, the East coordinate, and small squares for y, the North coordinate. The tape-and-shadow-determined waypoint coordinates are plotted as horizontal lines with steps at the approximate times when the rover was rolled from one waypoint to the next.

FIG. 12.

Figure 12:
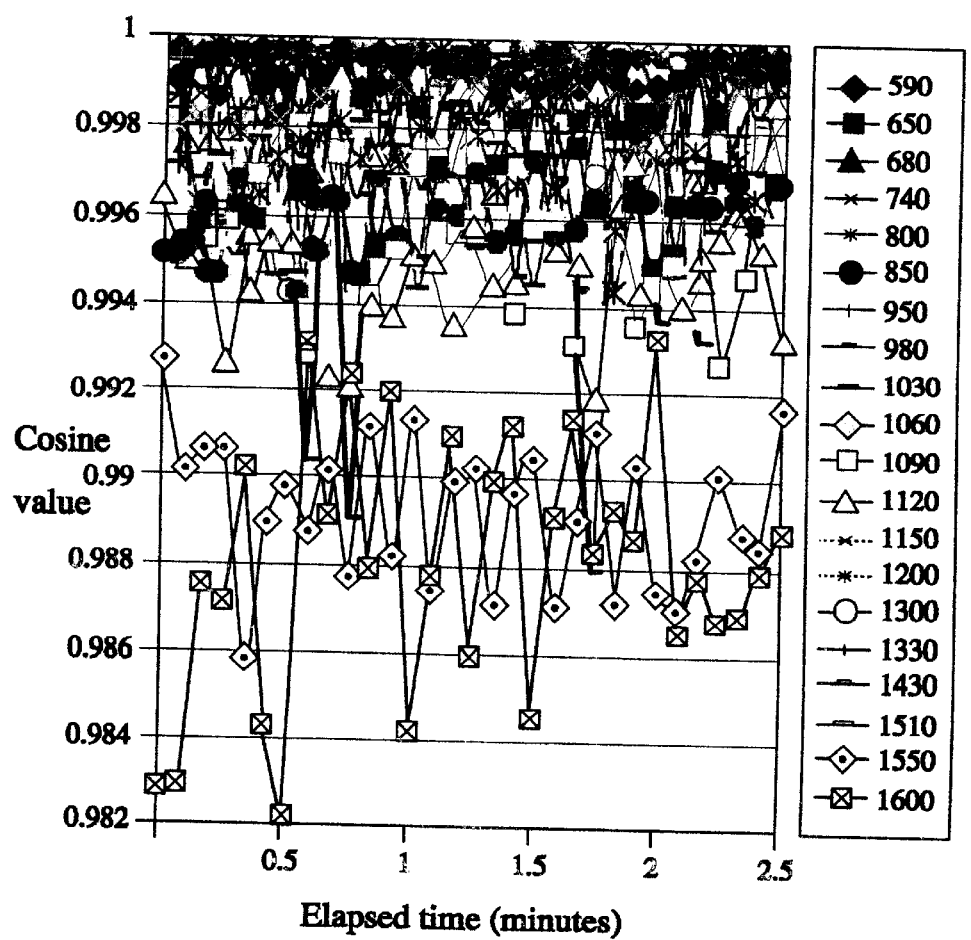
FIG. 12 is a plot showing values of individual cosine terms in the maximized ambiguity functions for the short-distance demonstration.

FIG. 12 shows the values of all the individual cosine terms (unweighted) in the maximized ambiguity functions for the first half of this experiment. A different plotting symbol and/or a different shade of gray is used for each of the twenty AM-broadcast transmitters used. (Twenty is a limit of our present plotting software. We have used more than thirty greater-Boston-area AM-broadcast stations in other experiments. We have also used as few as six, and still obtained a unique, correct, position-determination by maximizing the ambiguity function.) The frequencies of these transmitters, in kHz, are given in the legend at the right side of the plot. If there were no errors of observation, all of the cosine values would be exactly equal to one. In fact, all are greater than 0.982, and most are greater than 0.998.

The distance-error equivalent of an individual cosine term is $$\frac{\arccos(val)}{2\pi} \frac{c}{f},$$

in which val is the value of the term, c is the speed of light, and f is the carrier frequency of the radio station. Thus, for example, the smallest cosine value of 0.982 corresponds to a distance of about five meters.

FIG. 13.

Figure 13:
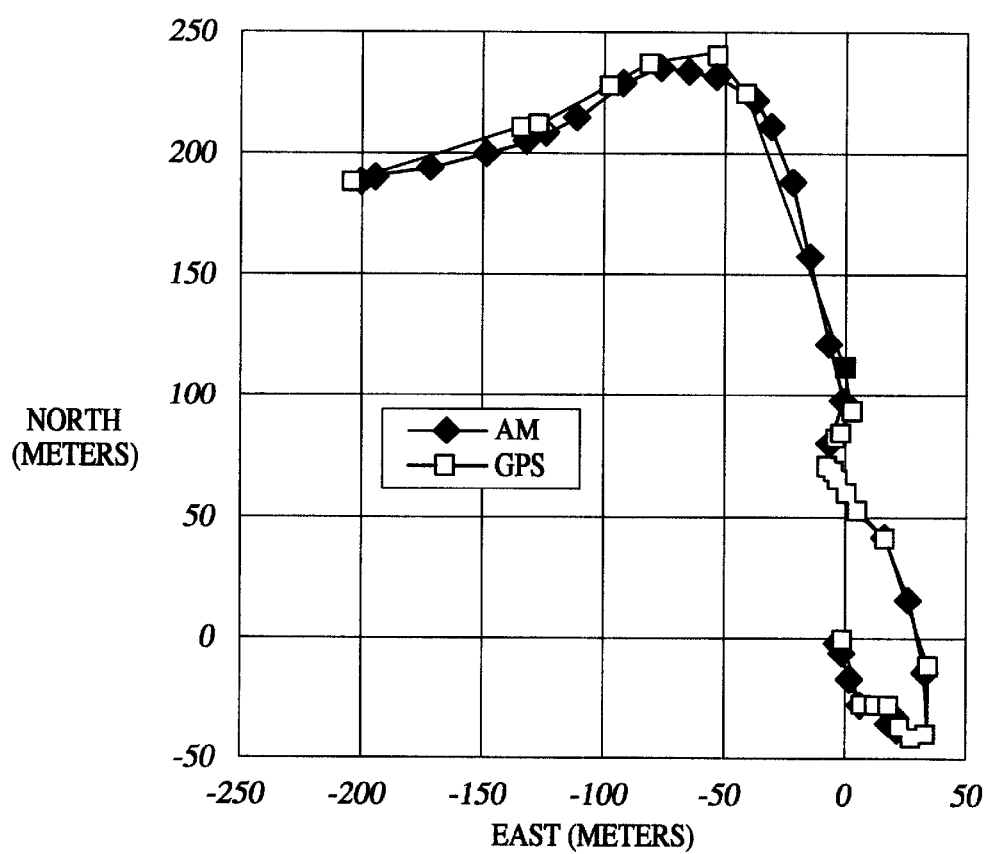
FIG. 13 is a plot showing instantaneous-positioning results from a longer-distance demonstration of the invention.

FIG. 13 shows results from a longer-distance experiment that we conducted at Hanscom Air Force Base in Massachusetts. The base receiver was left in a parking lot while the rover was driven to four waypoints in the back of a pickup truck. The receiver was removed from the truck at each waypoint to see how badly the truck perturbed the positioning results. FIG. 13 shows the rover positions determined by maximizing the ambiguity function independently at every 5-second observation epoch, not just when the receiver was out the truck. The position of the truck was also tracked with a GPS receiver. The GPS receiver was aided by differential ("DGPS") corrections from a station in Boston. FIG. 13 shows the positions determined by both the AM-broadcast and the DGPS tracking. The GPS receiver adaptively controlled its own sampling interval, so its epochs were not synchronized with the AM-broadcast positioning epochs. Even so, the plot clearly shows that the AM-broadcast instantaneous positioning and the GPS tracking results agree very well.

FIG. 14.

Figure 14:
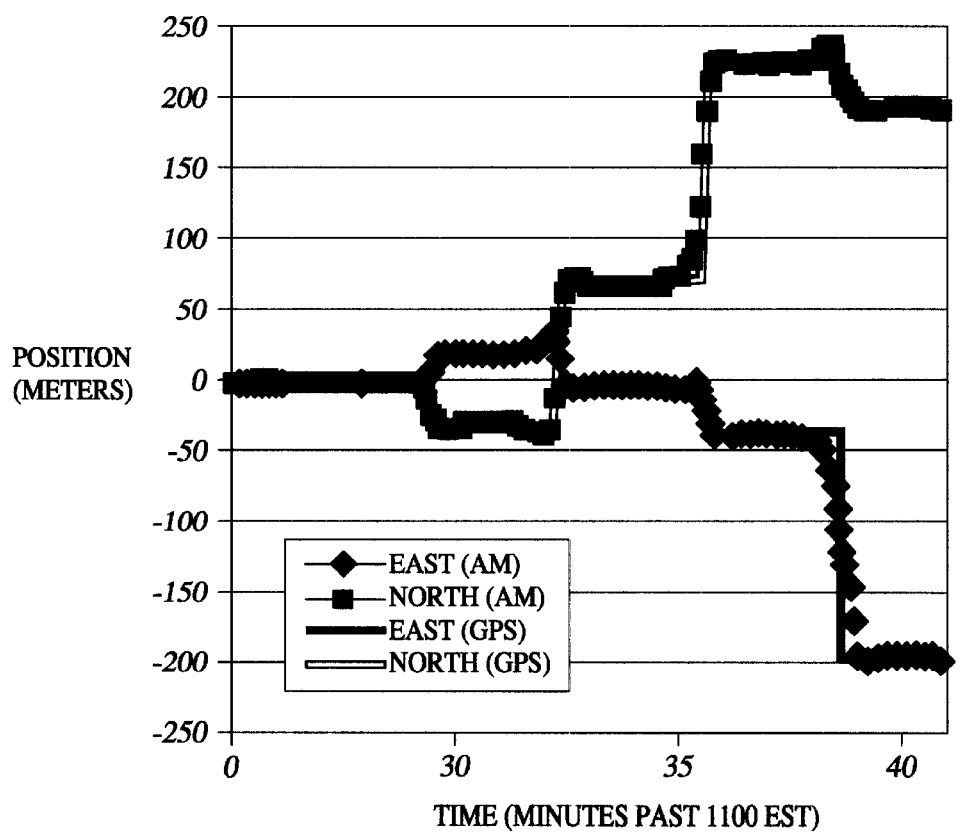
FIG. 14 is a graph showing results from the longer-distance demonstration plotted versus time.

FIG. 14 shows the same positioning results plotted versus time. The AM-broadcast-based, instantaneous position determinations are plotted with diamonds for x, the East coordinate, and small squares for y, the North coordinate. The DGPS-determined waypoint coordinates are plotted as horizontal lines with steps at the approximate times when the rover was driven from one waypoint to the next. In FIG. 14 it is possible to see how the roving receiver was removed from the truck shortly after arrival at each waypoint, set down on the waypoint a few meters from the truck, left stationary for a minute or two, then placed back in the truck prior to departure for the next waypoint. No significant positioning glitch occurs when the AM-broadcast receiver was handled, and no significant error appears due to proximity of the truck.

These observations suggest that AM-broadcast-based instantaneous positioning should work in the vicinity of other electrically-conducting bodies, as well. Because AM-broadcast-band signals (unlike the much shorter-wavelength signals of, say, GPS) penetrate houses and many building materials, instantaneous positioning in accordance with the present invention appears feasible indoors.

A problem with indoor positioning is that many of the conductors found there, such as pipes and wiring, may be long enough to be resonant within the AM broadcast band. A resonant wave-scatterer can cause a large phase perturbation for a carrier-wave near its resonant frequency. In such a situation, our instantaneous-positioning technique involving maximization of an ambiguity function has several important advantages. Perhaps the most important is that the technique is instantaneous, so that the ability to determine position at a given time does not depend on having maintained continuous phase-tracking of all stations' carrier-waves, with no dropouts, losses of lock, or cycle-slips, in the past. Another major advantage of the invention is that it can exploit practically every signal in the band, including signals much too weak to listen to. After the ambiguity function is maximized, discordant observations, i.e., those having cosine values significantly less than one, can be down-weighted or deleted, and the maximization repeated.

Replacing the cosine function, cos θ, in the formula for the ambiguity function, with a flat-bottomed function having the same 2π periodicity causes discordant observations to be downweighted automatically. Such a flat-bottomed 2π-periodic function is $(\frac{1}{2}+\frac{1}{2} \cos \theta)^n$, in which the exponent n is an integer greater than 1.

FIG. 15.

Figure 15:
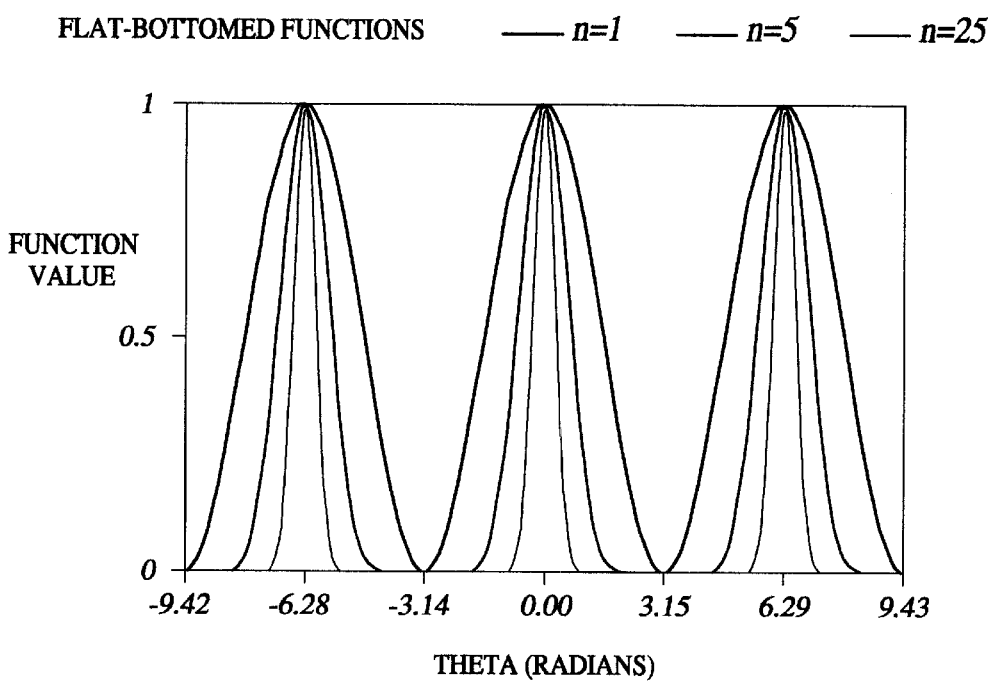
FIG. 15 is a graph showing periodic functions used in an alternative ambiguity-function embodiment.

FIG. 15 shows the periodic function $(\frac{1}{2}+\frac{1}{2} \cos \theta)_n$ plotted versus θ, for values of θ from −3π to +3π (through three 2π cycles of the function), and for three values of n: n =1, n=5, and n=25. The heaviest curve represents the function with n =1; a somewhat lighter curve represents the function with n=5; and the thinnest curve represents the function with n =25. The general trend is that, as n increases, the curve becomes more narrowly peaked at θ=. . . , −2π, 0, 2π, 4π, . . . , and develops wider, flatter bottoms in-between.

With n=1, the periodic function of θ is ½+½ cos θ, which is just a half-sized, biased version of cos θ. Substituting this function for cos θ in the ambiguity function has no effect at all on the position estimate, i.e., the position of the maximum of the ambiguity function.

With increasing values of n, the value of the periodic function $(\frac{1}{2}+\frac{1}{2} \cos \theta)^n$ becomes more and more sensitive to a small departure of θ from any of the periodic values . . . , −2π, 0, 2π, 4π, . . . , but less and less sensitive to a value of θ far from one of these periodic values. The effect of increasing n is therefore to make the position estimate less sensitive to observations with gross errors.

In the initial search for the maximum of an ambiguity function using this substitute function, n should be set equal to one. Then the value of n should be incremented and the ambiguity function should be re-maximized. The value of n should be incremented again and the ambiguity function should be maximized again, repeatedly, until the position estimate stabilizes or until the value of n exceeds 25, whichever occurs first. When n=25, the ambiguity function has substantially lost any sensitivity to a phase-difference observation differing from its theoretical counterpart by more than a substantial fraction of a radian at the ambiguity-function-maximizing position. However, the stopping value of n=25 is a somewhat arbitrary choice, and the practitioner may wish to experiment with different limits in different situations.

Making simultaneous observations of a number of transmitters that is greater than the minimum number required to determine position uniquely; looking for inconsistency between individual observations and theoretical expectations based on other present and past observations; and downweighting or discarding discordant observations, is the basis of a variety of so-called Receiver Autonomous Integrity Monitoring (RAIM) schemes that have been developed for GPS and related navigation receivers and systems. Some such schemes may be adapted advantageously to the present invention. The present invention is suited to such schemes better than most or all prior-art AM-broadcast-band-based positioning techniques because the present invention involves receiving and processing the entire band, not just selected signals.

A skilled practitioner will appreciate that the present invention is not limited to using the 530- to 1700-kHz band of frequencies. The invention is applicable to a wide variety of frequencies and types of signals, and different ones will be preferable in different situations. For example, lower-frequency signals travel great distances by ground-wave with less attenuation, so they are better suited for longer-distance navigation. Higher-frequency signals traveling by line-of-sight direct paths may be used to obtain finer accuracy in positioning within a smaller region. An example of the latter signals might be FM-broadcast-band signals.

An important aspect of the present invention is that a composite signal simultaneously including signals from a plurality of transmitters is formed by the receiver and converted from analog to digital form before processing to derive phase information, related to the receiver's position, for the signals received from each of the plurality of transmitters. Prior-art techniques favor a multi-channel approach in which signals received from different transmitters are separated and processed in different, dedicated, channels. A disadvantage of the multichannel approach is that different channels may introduce different phase or delay shifts, or "interchannel bias," that corrupts the position determination.

The present invention may appear disadvantageous because it requires digitizing a bandwidth much greater than that of one signal, in fact much greater than the sum of all the bandwidths of all the signals used to determine a position. This disadvantage is mitigated somewhat by the efficiency of the FFT. FFT processing of a wide-bandwidth composite is less feasible in a system requiring continuous tracking, than in an instantaneous-positioning system such as ours. In an instantaneous-positioning system it is not necessary for the FFT processing to keep up with continuous, real-time, raw-data acquisition. A burst of samples may be taken, then processed more or less at leisure.

The fact that the present invention preferably utilizes a large number of different signals—from every transmitter available within ground-wave range—might seem a disadvantage because using more signals implies using at least some much weaker signals. It is more difficult to track a weak signal without losing lock and/or dropping or slipping cycles. But really there is no such disadvantage, because the present invention does not require tracking. Using a sufficient number of different signals, with a substantial variety of different frequencies, enables position to be determined instantaneously, with no need for tracking, although of course tracking can be combined with instantaneous positioning (and we have done so, in experiments).

FIG. 16.

Figure 16:
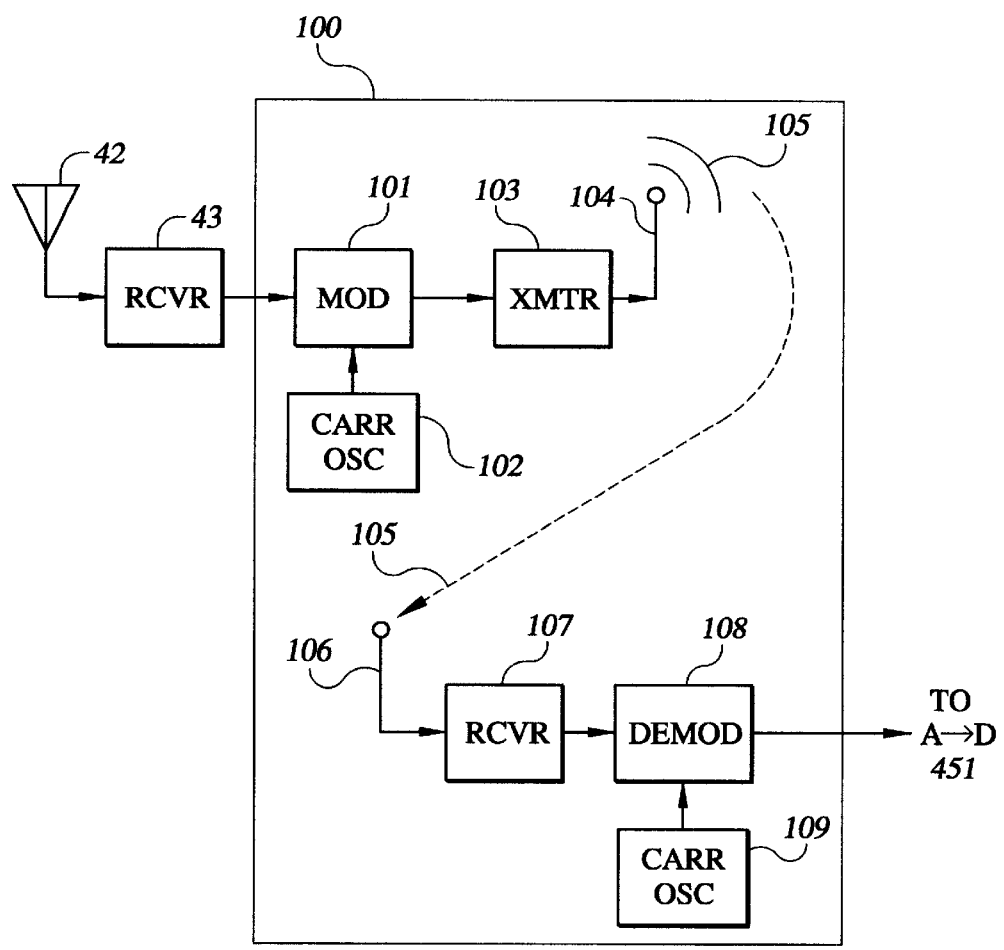
FIG. 16 is a block diagram showing a repeater enabling a radiopositioning antenna and receiver to be located away from their associated computer system.

FIG. 16 shows a repeater system 100 enabling radiopositioning antenna 42 and receiver 43 to be located away from their analog-to-digital converter 451 and the remainder of the associated computer system (not drawn here, but see FIG. 2 or FIG. 3). AM-broadcast-band signals received by antenna 42 and amplified and filtered in receiver 43 are applied to modulator 101 where they are combined with a repeater carrier-wave generated by carrier generator 102. The result is a modulated carrier which is transmitted by repeater transmitter 103 via repeater transmitting antenna 104.

A signal 105 radiated by antenna 104 and sensed by repeater receiving antenna 106 is applied to repeater-system receiver 107 whose output is demodulated by demodulator 108 by reference to a carrier-wave generated by carrier generator 109. The demodulated output of demodulator 108 is applied to analog-to-digital converter 451 and the remainder of the associated computer system as shown in FIG. 2.

The repeating transmitter subsystem comprising modulator 10 1, carrier oscillator 102, transmitter 103, and antenna 104 is a "bent-pipe" repeater. It simply repeats, at a different radio frequency, what receiver 43 hears. What emerges from repeater demodulator 108 is a replica of the output of receiver 43, with hopefully not much noise and distortion added. There is, of course, an added time-delay. However, any (reasonable) added time-delay is completely absorbed in the estimate of clock-synchronization-offset in the maximization of the ambiguity function, and the position determination is not affected. The repeater system 100 may also introduce "delay distortion," also known as "dispersion," meaning that its phase shift is not exactly proportional to frequency. However, any (reasonable) amount of delay distortion can be calibrated out by means of the phase-calibration signal injected into the receiver 43 input from calibration generator 63 as shown in FIGS. 4, 5, and 6.

As a skilled practitioner knows, a wide variety of frequency bands and modulation types, including digital types, are available for use in a transponder system 100.

Either antenna 42 and receiver 43, or antenna 52 and receiver 53, or both, may be located remotely by use of one or more transponder systems like that shown in FIG. 16. If more than one transponder system is used in the same area, they must transmit on different frequencies and/or with orthogonal modulation to avoid mutual interference. Typically, the transponder frequency or frequencies will be much higher than AM broadcast frequencies, and the transponder(s) will have limited range. However, a short-range transponder is typically much smaller and lighter than a computer system, and requires much less power. These are powerful advantages for a radiopositioning receiver carried by a person, an animal, or a very small vehicle.

We claim:

1. A method of instantaneously determining an unknown position using radio signals from a plurality of transmitters having widely distributed and known positions, the signals from different transmitters having respectively different radio frequencies, said frequencies being widely distributed, comprising:

(a) measuring the phases of said radio signals having said different radio frequencies arriving concurrently at said unknown position, to obtain a first set of phase-measurement data;

(b) measuring the phases of said radio signals having said different radio frequencies arriving concurrently at a known reference position, almost simultaneously with their arrival at said unknown position, to obtain a second set of phase-measurement data; and (c) combining said first and second data sets to determine said unknown position.

2. The invention of claim 1, wherein:

said radio signals arrive at said unknown position via ground-wave propagation from said plurality of transmitters.

3. The invention of claim 1, wherein:

said transmitters operate independently.

4. The invention of claim 1, wherein:

said radio signals are transmitted with random phases.

5. The invention of claim 1, wherein:

said first set of phase measurement data refers to a first instant of concurrent-signal-arrival at the unknown position, said second set of phase measurement data refers to a second instant of concurrent-signal-arrival time at the reference position, and the departure from simultaneity of said first and second instants is determined simultaneously with said determination of said unknown position.

6. The invention of claim 5, further comprising:

resolving position ambiguity related to the integer-cycle ambiguity inherent in said phase measurements.

7. The method of claim 5 further comprising forming an ambiguity function of the sets of phase-measurement data in a spatial parameter space and finding the location of the maximum of the ambiguity function.

8. The method of claim 7 wherein the ambiguity function is a sum, over all of the transmitters, of a periodic function of the phase-measurement data.

9. The method of claim 8 wherein the periodic function has a period of a cycle of phase.

10. The method of claim 9 wherein the periodic function is a cosine.

11. The method of claim 8 wherein the periodic function is $(½+½ \cosine\ \theta)^n$ where $\theta$ is a phase and n is greater than 1.

12. The method of claim 1 wherein a composite of said radio signals, simultaneously including a component signal from each of the transmitters, is digitized and then processed to measure said phases.

13. The method of claim 1 further comprising providing a repeater system allowing the phases of the signals to be measured away from where the signals are received.

14. The method of claim 7 wherein the ambiguity function is $$R(\hat{x}, \hat{y}, \hat{t}) = \sum_{j=1}^{J} W_r^j \cos(\theta^j - \hat{\theta}^j(\hat{x}, \hat{y}, \hat{t})).$$

15. Radiopositioning system for instantaneously determining an unknown position comprising:
  a plurality of spatially distributed transmitters at known locations, the transmitters. transmitting signals, wherein the signals from different transmitters have respectively different radio frequencies, the different radio frequencies being widely distributed;
  a first receiver located at the unknown position adapted to receive said signals having said different radio frequencies and to determine their phases to generate a first set of phase-measurement data;
  a second receiver located at a known reference position adapted to receive the same signals having said different radio frequencies and to determine their phases at the known reference position to generate a second set of phase-measurement data; and
  computing apparatus operating on the first and second sets of phase-measurement data to determine the unknown position.

16. The system of claim 15 wherein the computing apparatus is programmed to find the location in a parameter space of the maximum of an ambiguity function of the sets of phase-measurement data, the location of the maximum being the unknown position.

17. The system of claim 16 wherein the ambiguity function is a sum, over all of the transmitters, of a periodic function of the phase-measurement data.

18. The system of claim 17 wherein in the periodic function has a period of a cycle of phase.

19. The system of claim 18 wherein the periodic function is a cosine function.

20. The system of claim 18 wherein the periodic function is $(½+½ \cosine\ \theta)^n$ where $\theta$ is a phase and n is greater than 1.

21. The system of claim 16 wherein the ambiguity function is $$R(\hat{x}, \hat{y}, \hat{t}) = \sum_{j=1}^{J} W_r^j \cos(\theta^j - \hat{\theta}^j(\hat{x}, \hat{y}, \hat{t})).$$

22. The system of claim 15 wherein the output of the first and second receivers is a composite signal that is digitized for processing to determine the phases.

23. The system of claim 15 further including a repeater system allowing the receivers to be spatially remote from the phase determination.

24. The system of claim 15 wherein the first and second receivers receive the signals via ground-wave propagation from the transmitters.

25. The system of claim 15 wherein the transmitters transmit carrier signals having random phases.

26. The method of claim 5, further comprising determining said unknown position by:
  evaluating a function of said first and second sets of phase measurement data and of a trial value of said unknown position;
  searching a range of said trial values to find an extreme value of said function; and
  determining said unknown position from the trial value for which said extreme value is found.

27. The invention of claim 26 further comprising downweighting discordant members of said first and second sets of phase measurement data in the evaluation of said function.

28. A method of instantaneously determining an unknown position, comprising:
  collecting a composite of radio signals arriving simultaneously at said position from a plurality of transmitters having widely distributed and known positions, the signals from different transmitters having respectively different radio frequencies, said frequencies being widely distributed;
  forming a digital representation of said composite of said radio signals having said different radio frequencies;
  processing said digital representation to derive a first data set representing phases of signals received from each of said plurality of transmitters; and
  combining said first data set with a second data set representing phases of signals received at a known position from the same said plurality of transmitters, to determine said unknown position with respect to said known position.

29. The method of claim 28, wherein processing said digital representation includes:
  computing a spectrum of said digital representation; and
  finding peaks in said spectrum;
  deriving said first set of phase data from said peaks.

* * * * *